United States Patent [19]
Barthelemy et al.

[11] Patent Number: 5,478,492
[45] Date of Patent: Dec. 26, 1995

[54] COMPOSITIONS COMPRISING PENTAFLUOROBUTANE AND TRANS-1,2-DICHLOROETHYLENE AND USE OF THESE COMPOSITIONS

[75] Inventors: Pierre Barthelemy, Pietrebais; Mireille Paulus, Brussels; Robert Putteman, Lebbeke, all of Belgium

[73] Assignee: Solvay (Société Anonyme), Brussels, Belgium

[21] Appl. No.: 336,654

[22] Filed: Nov. 4, 1994

[30] Foreign Application Priority Data

Nov. 4, 1993 [BE] Belgium ............................. 09301214

[51] Int. Cl.$^6$ ................. C11D 7/30; C11D 7/50; C09K 3/18; C23G 5/028
[52] U.S. Cl. ............... 252/171; 134/40; 134/42; 252/170; 252/172; 252/194; 252/364; 252/DIG. 9
[58] Field of Search .................. 252/162, 170, 252/171, 172, 194, 364, DIG. 9; 134/40, 42

[56] References Cited

U.S. PATENT DOCUMENTS

| | | | |
|---|---|---|---|
| 5,064,560 | 11/1991 | Merchant | 252/171 |
| 5,099,081 | 3/1992 | Bolmer et al. | 570/180 |
| 5,099,082 | 3/1992 | Bolmer et al. | 570/180 |
| 5,208,398 | 5/1993 | Wismer | 570/177 |
| 5,268,120 | 12/1993 | Michaud | 252/162 |
| 5,268,121 | 12/1993 | Michaud | 252/171 |
| 5,348,681 | 9/1994 | Desbiendras et al. | 252/172 |
| 5,350,534 | 9/1994 | Michaud | 252/171 |

FOREIGN PATENT DOCUMENTS

| | | |
|---|---|---|
| 0512885 | 11/1992 | European Pat. Off. . |
| 618288 | 10/1994 | European Pat. Off. . |
| 5171190 | 7/1993 | Japan . |
| 5168805 | 7/1993 | Japan . |

*Primary Examiner*—Linda Skaling Therkorn
*Attorney, Agent, or Firm*—Spencer, Frank & Schneider

[57] ABSTRACT

The invention relates to compositions comprising 1,1,1,3,3-pentafluorobutane, 1,2-dichloroethylene and optionally a C1–C3 alkanol. These compositions can be used especially as solvents for cleaning and defluxing electronic components and for degreasing metals.

11 Claims, No Drawings

COMPOSITIONS COMPRISING PENTAFLUOROBUTANE AND TRANS-1,2-DICHLOROETHYLENE AND USE OF THESE COMPOSITIONS

The invention relates to compositions comprising pentafluorobutane and to the use of these compositions, especially as cleaning and/or drying agents for solid surfaces.

Completely halogenated chlorofluorinated hydrocarbons (CFCs), in particular 1,1,2-trichloro-1,2,2-trifluoroethane (CFC-113), are widely used as solvents in industry for degreasing and cleaning various surfaces, particularly for solid components of complicated shape which are difficult to clean. In addition to their use in electronics in cleaning soldering fluxes in order to remove the pickling flux which adheres to printed circuits, they are also conventionally used for degreasing metal components or for cleaning mechanical components of high quality and of high precision. In these various applications, CFC-113 is most often used in combination with other organic solvents, preferably in the form of azeotropic or pseudoazeotropic compositions having substantially the same composition in the vapour phase and in the liquid phase, so that they can be easily employed at reflux.

Compositions based on CFC-113 are also conventionally used as desiccating agents, in order to remove the water adsorbed at the surface of solid components.

However, CFC-113, as well as other completely halogenated chlorofluoroalkanes, is today suspected of being involved in the destruction of the stratospheric ozone layer.

Consequently, there is currently an urgent need to find new compositions which do not have a harmful influence on the ozone layer.

To this end, a certain number of azeotropic compositions based on hydrofluoroalkanes have recently been proposed. In particular, Patent Application EP-A-0,512,885 (Elf Atochem) proposes an azeotropic composition comprising, by weight, 93 to 99% of 1,1,1,3,3-pentafluorobutane (HFA-365mfc) and from 7 to 1% of methanol.

One of the objectives of the present invention is to provide other compositions, optionally forming azeotropes or pseudoazeotropes, which are particularly effective when they are used as cleaning agents in solvent cleaning processes. A further subject of the invention is such compositions having properties particularly suited to cleaning printed circuit boards. Another objective of the invention is to provide such compositions which do not have a destructive effect with respect to the ozone layer, compositions which can consequently be used as replacements for solvents based on completely halogenated chlorofluoroalkanes.

The present invention consequently relates to compositions comprising 1,1,1,3,3-pentafluorobutane and 1,2-dichloroethylene.

1,2-Dichloroethylene exists in two isomeric forms, cis-1,2-dichloroethylene and trans-1,2-dichloroethylene. For the purposes of the present invention, 1,2-dichloroethylene is understood to mean, without distinction, one or the other isomer or a mixture of these. Nevertheless, trans-1,2-dichloroethylene is the preferred isomer.

The 1,1,1,3,3-pentafluorobutane and 1,2-dichloroethylene contents in the compositions according to the invention can vary within wide limits, depending on the use envisaged.

The compositions according to the invention generally contain at least 45% by weight of 1,1,1,3,3-pentafluorobutane. They advantageously contain at least 50% by weight thereof. In a particularly preferred way, they contain at least 60% thereof. They can contain up to 90% by weight thereof. Most often, they contain at most 85% by weight thereof, preferably at most 80% by weight.

The compositions according to the invention contain from 10 to 55% by weight of 1,2-dichloroethylene. They preferably contain from 15 to 50% thereof. In a particularly preferred way, they contain from 20 to 40% thereof.

Advantageously, the compositions according to the invention additionally contain an alkanol chosen from methanol, ethanol, propanol and isopropanol. As a general rule, the amount of alkanol present in the compositions according to the invention does not exceed 15% of the weight of the composition. Preferably, they contain from 0.5 to 10% thereof.

Various additives can optionally be present in the compositions according to the invention. The compositions according to the invention can thus contain stabilizing agents, surface-active agents or any other additives making it possible to improve the behaviour of the compositions according to the invention during their use. The nature and the amount of these additives depend on the use envisaged and are easily defined by those skilled in the art. As a general rule, the amount of additives present in the compositions according to the invention does not exceed approximately 20% of the weight of the composition, most often not more than 10%.

Preferred compositions according to the invention are those which contain 1,1,1,3,3-pentafluorobutane and 1,2-dichloroethylene in proportions in which they form an azeotrope or a pseudoazeotrope.

Particularly preferred compositions according to the invention are those which contain 1,1,1,3,3-pentafluorobutane, 1,2-dichloroethylene and an alkanol chosen from methanol and ethanol in proportions in which they form a ternary azeotrope or pseudoazeotrope.

Fundamentally the thermodynamic state of a fluid is defined by four interdependent variables: the pressure (P), the temperature (T), the composition of the liquid phase (X) and the composition of the gas phase (Y). An azeotrope is a specific system containing at least two components in which, at a given temperature and a given pressure, X is exactly equal to Y. A pseudoazeotrope is a system containing at least two components in which, at a given temperature and a given pressure, X is substantially equal to Y. In practice, this means that the constituents of such azeotropic or pseudoazeotropic systems cannot be easily separated by distillation and consequently their composition remains substantially constant in solvent cleaning operations, as well as in operations for recovering spent solvents by distillation.

For the purposes of the present invention, pseudoazeotrope is understood to mean a mixture of two or a number of constituents whose boiling point (at a given pressure) differs from the boiling point of the azeotrope by at most 0.2° C.

1,1,1,3-Pentafluorobutane and 1,2-dichloroethylene form a binary azeotrope or pseudoazeotrope when their mixture consists essentially of 56% to 82% by weight of 1,1,1,3,3-pentafluorobutane and of 44 to 18% by weight of 1,2-dichoroethylene. A preferred composition forming an azeotrope or pseudoazeotrope consists of 60 to 78% by weight of 1,1,1,3,3-pentafluorobutane and of 40 to 22% by weight of 1,2-dichloroethylene. At a pressure of 1022 mbar, the binary composition consisting essentially of approximately 70% by weight of 1,1,1,3,3-pentafluorobutane and of approximately 30% by weight of 1,2-dichloroethylene constitutes an azeotrope whose boiling point is approximately 36.3° C. This composition is very particularly advantageous.

1,1,1,3,3-pentafluorobutane, 1,2-dichloroethylene and methanol form a ternary azeotrope or pseudoazeotrope when their mixture consists essentially of 62 to 68% by weight of 1,1,1,3,3-pentafluorobutane, of 28 to 34% by weight of 1,2-dichloroethylene and of 2 to 7% by weight of methanol. At atmospheric pressure, the ternary composition consisting essentially of approximately 64.9% by weight of 1,1,1,3,3-pentafluorobutane, approximately 31.5% by weight of 1,2-dichloroethylene and approximately 3.6% by weight of methanol constitutes an azeotrope whose boiling point is approximately 32° C. This composition is very particularly advantageous.

1,1,1,3,3-Pentafluorobutane, 1,2-dichloroethylene and ethanol form a ternary azeotrope or pseudoazeotrope when their mixture consists essentially of 64 to 68% by weight of 1,1,1,3,3-pentafluorobutane, of 30 to 35% by weight of 1,2-dichloroethylene and of 1 to 3% by weight of ethanol. At atmospheric pressure, the ternary composition consisting essentially of approximately 66.1% by weight of 1,1,1,3,3-pentafluorobutane, approximately 32.3% by weight of 1,2-dichloroethylene and approximately 1.6% by weight of ethanol constitutes an azeotrope whose boiling point is approximately 34° C. This composition is very particularly advantageous.

The compositions according to the invention have a suitable boiling point for replacing compositions based on CFC-113 in existing cleaning equipment. As regards its impact on the environment, 1,1,1,3,3-pentafluorobutane appears particularly advantageous, since it has a zero destructive potential for ozone. The compositions according to the invention are additionally inert towards the various types of surfaces to be treated, whether they are metal, plastic or glass.

The compositions according to the invention can consequently be used in the same applications and according to the same techniques as the prior compositions based on CFC-113. In particular, the compositions according to the invention can be used as cleaning agents, solvents, degreasing agents, defluxing agents or desiccating agents. The ternary compositions containing an alkanol appear particularly advantageous, in particular those where the constituents are present in proportions in which they form an azeotrope or pseudoazeotrope.

The invention consequently also relates to the use of the compositions according to the invention as cleaning agents, as degreasing agents for solid surfaces, as cleaning agents for printed circuit boards contaminated by a pickling flux and residues from this flux, or as desiccating agents for removing the water adsorbed at the surface of solid objects.

The examples below, without implied limitation, illustrate the invention in a more detailed way.

EXAMPLE 1

A glass apparatus consisting of a 50 ml distillation flask surmounted by a reflux condenser was used to reveal the existence of binary azeotropic or pseudoazeotropic compositions between 1,1,1,3,3-pentafluorobutane and 1,2-dichloroethylene. The temperature of the liquid is measured using a thermometer inserted into the flask.

20.9 g of pure 1,1,1,3,3-pentafluorobutane were heated at a pressure of 1022 mbar until boiling and then small amounts of trans-1,2-dichloroethylene, accurately weighed, were progressively introduced into the flask using a syringe, via a side tube.

Determination of the azeotropic composition was carried out by noting a change in the boiling temperature of the mixture according to its composition. The composition for which a minimum boiling point was observed is the azeotropic composition at the operating pressure.

The boiling temperatures obtained for different compositions of 1,1,1,3,3-pentafluorobutane (PFBA) and trans-1,2-dichloroethylene (DCEe) are collated in the table below. It is observed therein that the best estimation of the composition for which the boiling point is minimum (36.3° C.) is approximately 70% by weight of 1,1,1,3,3-pentafluorobutane and 30% by weight of trans-1,2-dichloroethylene. The boiling point is 36.5° C.±0.2° C. for a composition containing approximately 56 to 82% by weight of 1,1,1,3,3-pentafluorobutane, at a pressure of 1022 mbar.

TABLE I

| PFBA, g | DCEe added, g (cumulative amt.) | DCEe Content weight % | mol % | Boil. point °C. |
|---|---|---|---|---|
| 20.9 | 0 | 0.00 | 0.00 | 40.8 |
|  | 0.087 | 0.42 | 0.63 | 40.5 |
|  | 0.211 | 1.00 | 1.52 | 40.3 |
|  | 0.488 | 2.28 | 3.44 | 39.9 |
|  | 0.826 | 3.80 | 5.69 | 39.4 |
|  | 1.018 | 4.65 | 6.92 | 39.1 |
|  | 1.302 | 5.86 | 8.69 | 38.8 |
|  | 1.629 | 7.23 | 10.63 | 38.4 |
|  | 1.891 | 8.30 | 12.14 | 38.1 |
|  | 2.228 | 9.63 | 14.00 | 37.8 |
|  | 2.627 | 11.16 | 16.10 | 37.7 |
|  | 3.018 | 12.62 | 18.06 | 37.4 |
|  | 3.570 | 14.59 | 20.69 | 37.1 |
|  | 4.019 | 16.13 | 22.69 | 36.9 |
|  | 4.577 | 17.90 | 24.98 | 36.7 |
|  | 5.451 | 20.68 | 28.48 | 36.6 |
|  | 5.939 | 22.13 | 30.26 | 36.5 |
|  | 6.459 | 23.61 | 32.06 | 36.4 |
|  | 7.331 | 25.97 | 34.88 | 36.4 |
|  | 7.837 | 27.27 | 36.41 | 36.3 |
|  | 9.120 | 30.38 | 39.98 | 36.3 |
|  | 9.896 | 32.13 | 41.96 | 36.3 |
|  | 10.578 | 33.60 | 43.59 | 36.4 |
|  | 12.163 | 36.79 | 47.05 | 36.5 |
|  | 13.899 | 39.94 | 50.38 | 36.5 |
|  | 16.403 | 43.97 | 54.51 | 36.7 |
|  | 20.529 | 49.55 | 59.99 | 37.1 |
|  | 25.335 | 54.80 | 64.92 | 37.9 |
|  | 28.117 | 57.36 | 67.26 | 38.2 |

EXAMPLE 2

A solution containing 66.2% by weight of 1,1,1,3,3-pentafluorobutane, 29.8% by weight of trans-1,2-dichloroethylene and 4% by weight of methanol was prepared. This solution was subjected to a distillation at atmospheric pressure using a Vigreux column. The boiling temperature remained constantly equal to 32° C. The various fractions of the distillate, each representing from 5 to 20% of the weight of the initial solution, were withdrawn using a multi-limb distributor ("pig") and then analysed by gas phase chromatography. The results obtained are collated in Table II.

TABLE II

| Fraction of the distillate | PFBA (weight %) | DCEe (weight %) | Methanol (weight %) |
|---|---|---|---|
| 1 (5.7 weight % of the solution) | 64.9 | 31.5 | 3.6 |
| 2 (12.1 weight % of the solution | 65.1 | 31.2 | 3.7 |
| 3 (16.5 weight % of the solution | 65.3 | 31.0 | 3.7 |
| 4 (15.0 weight % of the solution | 65.6 | 30.7 | 3.7 |
| 5 (10.3 weight % of the solution | 65.9 | 30.3 | 3.8 |
| 6 (14.0 weight % of the solution | 66.2 | 30.0 | 3.8 |

The virtually identical composition of the various fractions obtained shows the existence of a ternary azeotrope between 1,1,1,3,3-pentafluorobutane, trans-1,2-dichloroethylene and methanol, the estimated composition of which is 64.9% by weight of 1,1,1,3,3-pentafluorobutane, 31.5% by weight of trans-1,2-dichloroethylene and 3.6% by weight of methanol.

EXAMPLE 3

A solution containing 66.2% by weight of 1,1,1,3,3-pentafluorobutane, 32.1% by weight of trans- 1,2-dichloroethylene and 1.7% by weight of ethanol was prepared. This solution was subjected to a distillation at atmospheric pressure using a Vigreux column. The boiling temperature remained constantly equal to 34° C. The various fractions of the distillate, each representing approximately from 5 to 15% of the weight of the initial solution, were withdrawn using a multi-limb distributor ("pig") and then analysed by gas phase chromatography. The results obtained are collated in Table III.

TABLE III

| Fraction of the distillate | | PFBA (weight %) | DCEe (weight %) | Ethanol (weight %) |
|---|---|---|---|---|
| 1 | (4.8 weight % of the solution) | 66.1 | 32.4 | 1.5 |
| 2 | (16.7 weight % of the solution | 66.1 | 32.3 | 1.6 |
| 3 | (12.7 weight % of the solution | 66.1 | 32.3 | 1.6 |
| 4 | (12.2 weight % of the solution | 66.3 | 32.1 | 1.6 |
| 5 | (12.1 weight % of the solution | 66.2 | 32.2 | 1.6 |
| 6 | (15.1 weight % of the solution | 66.2 | 32.2 | 1.6 |
| 7 | (10.5 weight % of the solution | 66.3 | 32.0 | 1.7 |

The virtually identical composition of the various fractions obtained reveals the existence of a ternary azeotrope between 1,1,1,3,3-pentafluorobutane, trans-1,2-dichloroethylene and ethanol, the estimated composition of which is 66.1% by weight of 1,1,1,3,3-pentafluorobutane, 32.3% by weight of trans-1,2-dichloroethylene and 1.6% by weight of ethanol.

We claim:

1. An azeotropic composition or a composition in which, at a given temperature and pressure, the composition of the vapor phase is substantially the same as the composition of the liquid phase consisting essentially of 56% to 82% by weight of 1,1,1,3,3-pentafluorobutane and 44% to 18% by weight of trans-1,2-dichloroethylene wherein the composition has a boiling point of about 36.5° C. at 1022 mbar.

2. A composition according to claim 1, consisting essentially of 60% to 78% by weight of 1,1,1,3,3-pentafluorobutane and 40% to 22% by weight of trans-1,2-dichloroethylene.

3. A composition according to claim 1, consisting essentially of 70% by weight of 1,1,1,3,3-pentafluorobutane and 30% by weight of trans-1,2-dichloroethylene.

4. An azeotropic composition or a composition in which, at a given temperature and pressure, the composition of the vapor phase is substantially the same as the composition of the liquid phase consisting essentially of 62% to 68% by weight of 1,1,1,3,3-pentafluorobutane 28% to 34% by weight of trans-1,2-dichloroethylene, and 2% to 7% by weight of methanol wherein the composition has a boiling point of about 32° C. at atmospheric pressure.

5. A composition accordingly to claim 4, consisting essentially of about 64.9% by weight of 1,1,1,3,3-pentafluorobutane, about 31.5% by weight of trans-1,2-dichloroethylene, and about 3.6% by weight of methanol.

6. An azeotropic composition or a composition in which, at a given temperature and pressure, the composition of the vapor phase is substantially the same as the composition of the liquid phase consisting essentially of 64% to 68% by weight of 1,1,1,3,3-pentafluorobutane, 30% to 35% by weight of trans-1,2-dichloroethylene, and 1% to 3% by weight of ethanol wherein the composition has a boiling point of about 34° C. at atmospheric pressure.

7. A composition according to claim 6, consisting essentially of about 66.1% by weight of 1,1,1,3,3-pentafluorobutane, about 32.3% by weight of trans-1,2-dichloroethylene, and about 1.6% by weight of ethanol.

8. A cleaning agent consisting essentially of an effective amount of a composition according to claim 1, 4, or 6.

9. A degreasing agent consisting essentially of an effective amount of a composition according to claim 1, 4, or 6.

10. A cleaning agent for printed circuit boards contaminated by a pickling flux and residues from this flux consisting essentially of a composition according to claim 1, 4, or 6.

11. A desiccating agent for removing the water adsorbed at the surface of solid objects consisting essentially of a composition according to claim 1, 4, or 6.

* * * * *